(12) United States Patent
Candy et al.

(10) Patent No.: US 7,460,605 B2
(45) Date of Patent: Dec. 2, 2008

(54) TIME REVERSAL COMMUNICATION SYSTEM

(75) Inventors: James V. Candy, Danville, CA (US); Alan W. Meyer, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 372 days.

(21) Appl. No.: 10/289,774

(22) Filed: Nov. 6, 2002

(65) Prior Publication Data

US 2003/0138053 A1    Jul. 24, 2003

Related U.S. Application Data

(60) Provisional application No. 60/333,231, filed on Nov. 15, 2001.

(51) Int. Cl.
*H04L 27/00*    (2006.01)
(52) U.S. Cl. .................... 375/259; 375/346; 375/347; 375/348; 375/349
(58) Field of Classification Search ............... 375/144, 375/150, 259, 233, 295, 346–348
See application file for complete search history.

(56) References Cited

U.S. PATENT DOCUMENTS

| | | | |
|---|---|---|---|
| 5,155,742 A | 10/1992 | Ariyavisitakul et al. | |
| 5,335,250 A * | 8/1994 | Dent et al. | 375/224 |
| 5,428,999 A | 7/1995 | Fink | |
| 5,809,083 A * | 9/1998 | Wright | 375/285 |
| 5,914,959 A * | 6/1999 | Marchetto et al. | 370/468 |
| 6,035,197 A * | 3/2000 | Haberman et al. | 455/439 |
| 6,173,011 B1 * | 1/2001 | Rey et al. | 375/233 |
| 6,301,291 B1 * | 10/2001 | Rouphael et al. | 375/150 |
| 6,643,520 B1 * | 11/2003 | Park et al. | 455/522 |
| 6,658,050 B1 * | 12/2003 | Ramesh et al. | 375/219 |
| 6,728,233 B1 * | 4/2004 | Park et al. | 370/342 |
| 6,834,043 B1 * | 12/2004 | Vook et al. | 370/310 |
| 2001/0037075 A1 | 11/2001 | Candy | |
| 2002/0176485 A1 * | 11/2002 | Hudson | 375/144 |
| 2002/0186761 A1 * | 12/2002 | Corbaton et al. | 375/231 |

FOREIGN PATENT DOCUMENTS

| | | |
|---|---|---|
| DE | 3842423 A1 | 6/1990 |
| EP | 0 498 422 A2 | 8/1992 |
| EP | 0 961 436 A2 | 12/1999 |
| WO | WO 01/0446 A2 | 10/2001 |

OTHER PUBLICATIONS

Bellanger, "Adaptive Digital Filters," 1987, Marcel Dekker, Inc., New York, NY, XP002236665, paragraph 12.3.2 (4 pages).

Zazo, S., et al., "Pre-Rake and Multiuser Detection Techniques in UTRA-TDD Systems," VTC 2000-Spring, 2000, IEEE 51st. Vehicular Technology Conf., Proceedings, Tokyo, Japan, May 15-18, 2000, IEEE Vehicular Technology Conf., New York, NY, IEEE, US, vol. 3 of 3, Conf. 51, May 15, 2000, pp. 2069-2072.

* cited by examiner

*Primary Examiner*—Curtis B Odom (57) ABSTRACT

A system of transmitting a signal through a channel medium comprises digitizing the signal, time-reversing the digitized signal, and transmitting the signal through the channel medium. The channel medium may be air, earth, water, tissue, metal, and/or non-metal.

51 Claims, 9 Drawing Sheets

TIME REVERSAL COMMUNICATION SYSTEM

CROSS-REFERENCE TO RELATED APPLICATIONS

This application claims the benefit of U.S. Provisional Application No. 60/333,231 filed Nov. 15, 2001 and entitled "Time Reversal Communications." U.S. Provisional Application No. 60/333,231 filed Nov. 15, 2001 and entitled "Time Reversal Communications" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to communications and more particularly to a time reversal communication system.

2. State of Technology

U.S. Pat. No. 5,155,742 for a time dispersion equalizer receiver with a time-reversal structure for TDMA portable radio systems to Sirikiat Ariyavisitakul and Hamilton Arnold provides the following background information, "Although the performance (i.e., low block error rate) of a receiver in a TDM/TDMA portable digital radio communications system using a time reversal phase equalizer structure for very high bit rate data communications will not be as high as a receiver using a time reversal conventional DFE structure, its performance for expanding coverage areas at moderate bit rates expected in voice communications has been experimentally found to be acceptable and is simpler to implement than receivers using conventional equalization techniques without the time reversal structure."

U.S. Pat. No. 5,428,999 for a method and apparatus for acoustic examination using time reversal to Fink, Mathias provides the following background information, "A method for acoustic examination of a medium and detection of reflective targets includes a preliminary step of injecting a divergent sound beam into the medium from at least one transducer. Then the echo signals reflected by the medium and received by several transducers in an array are picked up. A time gate is used to select echoes coming from a particular zone of the medium. The echoes are stored, time-reversed and re-emitted. The signals newly reflected by the medium are stored and the time-reversal operation is repeated. After a final time reversal of rank 2n+1 (where n is a positive non-zero integer) over the full depth of the measurement time gate, the characteristics of the wavefront passing closest to the maxima of the signals are determined, advantageously in the form of a time distribution of the maxima. The characteristics can often be approximated with a polynomial law. An apparatus is disclosed for implementing the method."

U.S. Patent Application No. 2001/0037075 published Nov. 1, 2001 entitled "Method and Apparatus for Dynamic Focusing of Ultrasound Energy" by James V. Candy, assigned to the Regents of the University of California, provides background information regarding using a methodology to obtain time series measurement data (or "data") reconstructing an inhomogeneous medium using time-reversal (T/R) focusing, "When a wave propagates through a spatio-temporal medium (e.g., tissue), the resulting wavefront is distorted. This distortion is related to the medium as well as the type of source creating this phenomenon. If a media is homogenous, then its sound velocity profile, density/temperature profile, index of refraction or related velocity function is independent of spatial position. An inhomogeneous medium possesses an inherent property related to velocity that does vary with spatial position. If the medium is homogenous and the source resides in the near field, then a spherical-type wavefront evolves. But if the medium is inhomogeneous, then a distorted wavefront results. In the homogenous medium, simple time-delay processing is sufficient to enhance the field at a given point; however, this is not necessarily the case in an inhomogeneous medium, since the amplitude as well as the phase may be distorted during propagation."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system of transmitting a signal through a channel medium. The channel medium may be air, earth, water, tissue, metal, and/or non-metal. The system comprises digitizing the signal, time-reversing the digitized signal, and transmitting the signal through the channel medium. In one embodiment digitizing the signal is performed in connection with a transmitter. In one embodiment digitizing the signal is performed in connection with a receiver. In one embodiment time-reversing the digitized signal is performed in connection with a transmitter. In one embodiment time-reversing the digitized signal is performed in connection with a receiver. In one embodiment a multiplicity of transmitters are used in transmitting the signal through the channel medium. In one embodiment a multiplicity of receivers are used in transmitting the signal through the channel medium. One embodiment includes estimating Green's function of the channel medium. One embodiment includes determining the Green's function of the channel medium. One embodiment includes transmitting a pilot signal through the channel medium. One embodiment includes estimating a pilot signal as it would be transmitted through the channel medium. In one embodiment a multiplicity of link stations are used in transmitting the signal through the channel medium. One embodiment provides a secure communication to an individual link station of a multiplicity of link stations by digitizing the signal and time-reversing the digitized signal in connection with transmitting the signal through the channel medium to the individual link station.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the drawings, to the following information, and to incorporated materials; detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Communicating critical information over noisy channels in hostile environments whether they be a chaotic battlefield, or in disaster emergencies evolving from natural disasters like earthquakes, tornadoes or floods, or on the floor of a securities exchange, or even in the clandestine operations of national security—the data must be reliably received and extracted. A typical communications channel is subjected to a variety of noise and signal distortions, corrupting the fidelity of the information being transmitted, and reducing the effective capacity of the channel.

The present invention provides a communication system for transmitting a signal through a channel medium. The system comprises a transmitter adapted to transmit the signal, a receiver adapted to receive the signal, a digitizer that digitizes the signal, and a time-reversal signal processor adapted to time-reverse the digitized information signal. The channel medium may be air, earth, water, tissue, metal, and/or non-metal. In one embodiment the time-reversal signal processor is operatively connected to the transmitter.

In one embodiment the time-reversal signal processor is operatively connected to the receiver. In one embodiment the digitizer is operatively connected to the transmitter. In one embodiment the digitizer is operatively connected to the receiver. In one embodiment the time-reversal signal processor and the digitizer are operatively connected to the transmitter. In one embodiment the time-reversal signal processor and the digitizer are operatively connected to the receiver.

One embodiment includes a signal processor adapted to estimate Green's function of the channel medium. One embodiment includes a signal processor adapted to determine Green's function of the channel medium. One embodiment includes means for transmitting a pilot signal through the channel medium. One embodiment includes means for estimating a pilot signal, as it would be transmitted through the channel medium. One embodiment includes means for transmitting a pilot signal through the channel medium, means for estimating a pilot signal as it would be transmitted through the channel medium, and means for comparing the pilot signal and the estimated pilot signal. One embodiment includes a multiplicity of at least one of the transmitters and receivers. One embodiment includes a multiplicity of link stations operatively connected to at least one of the transmitters and receivers. One embodiment includes a communications array. One embodiment includes a communications array operatively connected to the transmitter. One embodiment includes a communications array operatively connected to the receiver. One embodiment includes a communications array operatively connected to the transmitter and a communications array operatively connected to the receiver.

Figure 1:
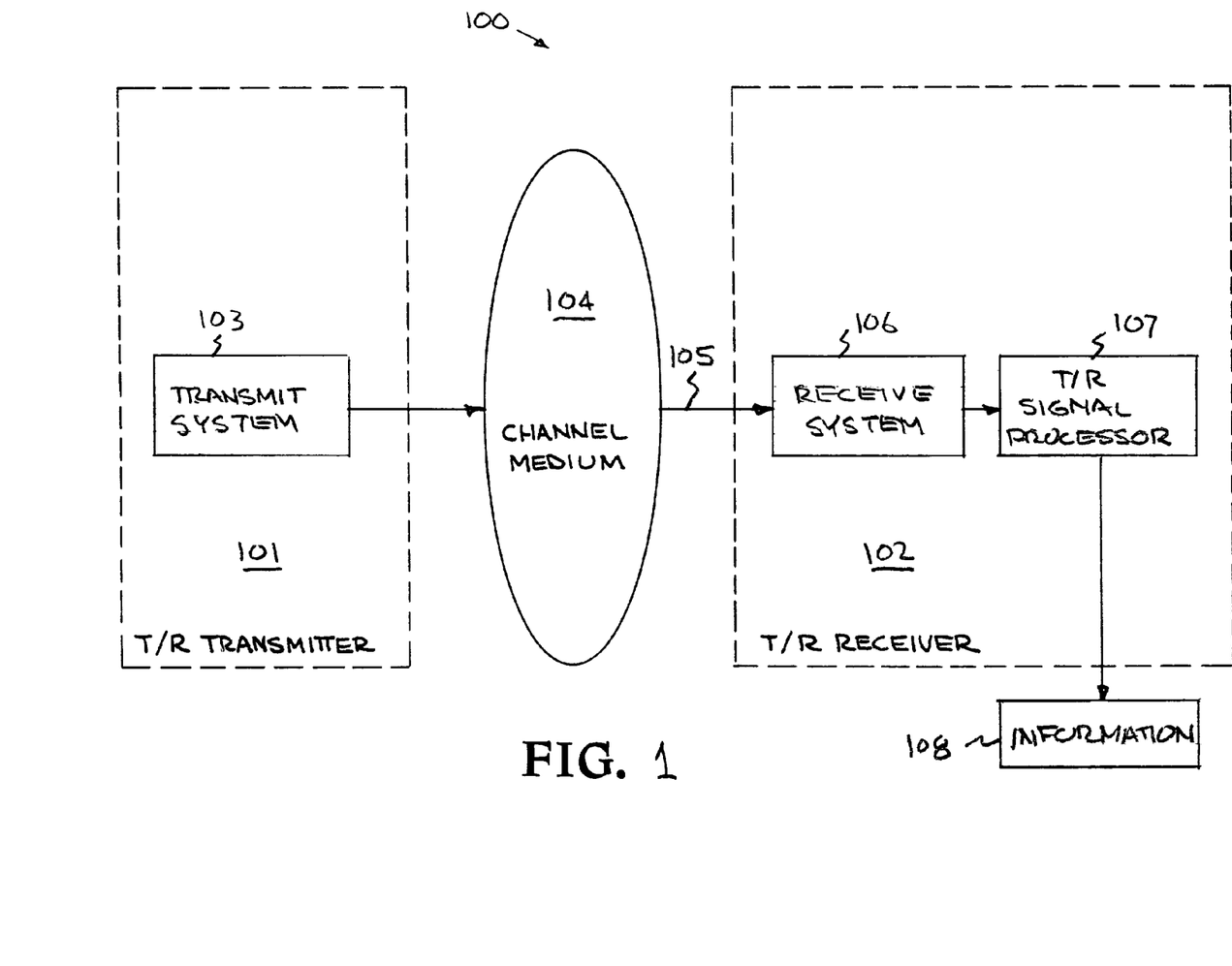
FIG. 1 illustrates an embodiment of a communications system using time reversal.

Referring now to FIG. 1, an embodiment of a communications system using time reversal is illustrated. The system is designated generally by the reference numeral 100. The communications system 100 provides a time reversal communication system for communicating critical information over noisy channels in a hostile environment. The system 100 uses time reversal signal processing (TRSP) that compensates the transmission channel while mitigating the need for detailed prior knowledge of the channel characteristics. The TRSP increases channel bandwidth, thereby enabling the proportional increase in the volume of information. This is important in many situations such as battlefield communications, inner-city wireless communications, ultrahigh bandwidth wireless networks, and other environments. The system 100 has many uses, for example it can be used for improving communications, for secure communications, for battlefield communications, for inner-city wireless communications, for ultrahigh bandwidth wireless networks, for communicating information over noisy channels in a hostile environment, and other applications.

The communications system 100 applies time-reversal (TR) to mitigate the deleterious effects of a noisy communications channel in a hostile noisy environment including single and multi-channel situations. Undesirable characteristics of a typical communications channel are the frequency dependent attenuation of any transmitted signal, the corruption of a signal in noise, and the distortion effects caused by effects of echoes and reverberation or multipath. Unlike most other characteristics that corrupt a communications channel, the detrimental effects of multipath cannot be overcome by merely increasing the transmitted power. Multipath is an important factor in the deterioration of communication channels. Although the power in every signal diminishes as a function of the distance between the transmitter and receiver, multipath can create destructive interference resulting in a loss of received power in a very localized area. This localized loss of power is often referred to as fading. Multipath can further reduce the effectiveness of a channel by increasing the inter-symbol interference. Inter-symbol interference is the condition where, although the received signal has sufficient power, the receiver is confused by the simultaneous arrival of two different symbols.

One of the advantage of a time-reversal processor is the ability to incorporate the multipath return and actually use it to increase signal to noise ratio. By merely time reversing the array signal and summing them it is possible to obtain an enhanced information packet (in this case a pulse) that can eventually be recovered at the receiver.

The communications system 100 utilizes an approach based on a "time-reversal processor" (TRP). Time-reversal is the dynamic broadband analog of the well-known phase conjugate mirror used to focus narrowband monochromatic waves. This same basic reversal principle holds in digital signal processing in two-pass digital filter design in which a signal is filtered, reversed and refiltered to provide an enhanced signal with the phase preserved indicating a zero-phase filter response. From the signal processing perspective the TRP represents the "optimal" spatio-temporal matched filter in the sense of maximizing the output signal-to-noise ratio (SNR). It is essentially a technique, which can be used to "remove" the aberrations created by an inhomogeneous or random channel. TRP can be used to decode transmitted information into the channel without requiring a detailed channel model required by all other model-based schemes.

The communications system 100 utilizes a "point-to-point" time-reversal (T/R) receiver to recover an information sequence or code from a set of receiver measurements in a highly reverberant, temporally stationary environment. It should be noted that the technique is available for arrays of sensors on both the transmit and receive "sides" of the medium and the theory and implement incorporating sensor arrays is simple following the information herein. The description of the communications system 100 is initially based on the point-to-point case. The array implementation will be discussed subsequently.

The applicability of time-reversal processing to the communications problem without the need to model the channel medium explicitly is a tantalizingly important property, since most media are unknown, random and temporal coherence degrades significantly. A TR processor simply processes the transmitted time series (which can be multi-channel using an array) from the channel under investigation. Next it collects the array data, digitizes, time-reverses the temporal (array) signals and re-transmits them back through the medium to remove channel distortions.

The basic principle of time reversal processing, in its simplest form can succinctly be characterized by the following. Consider the spatio-temporal propagation of source information, $i(r_o, t)$ located at $r_o$ and time t through a channel medium characterized by the channel Green's function (impulse response) $C(r, r_o; t)$. We also define the channel Green's function as, $g(r, r_o; t)$, from the source to location. Note that we will use these functions interchangeably throughout this disclosure. From systems theory, we know that this operation is given by convolution to yield the received signal, that is, $$R(r, t) = C(r, r_o; t) * i(r_o, t) \overset{F}{\Leftrightarrow} R(r, \omega) = C(r, r_o; \omega)I(r_o, \omega),$$ (Equation 1)

where the applicants have also shown the equivalent Fourier transform representation. Based on the underlying theory, applicants "re-transmit" or "back-propagate" from r, through the channel, back to the original source position at $r_o$, and choose to transmit the time-reversed signal, $R(r, -t)$, then $$\hat{i}(r_o, t) = C(r_o, r; t) * R(r, -t) \overset{F}{\Leftrightarrow}$$ (Equation 2)
$$\hat{i}(r_o, \omega) = C(r_o, r; \omega)R*(r, \omega),$$

utilizing the Fourier transform conjugation property. But substituting the reversed signal into this equation and invoking the Reciprocity Theorem ($C(r_o, r; t) \equiv C(r, r_o; t)$) interchanging source and receiver position gives $$\hat{i}(r_o, t) = C(r_o, r; t) * C(r_o, r; -t) * i(r_o, -t) \overset{F}{\Leftrightarrow}$$ (Equation 3)
$$\hat{I}(r, \omega) = |C(r, r_o; \omega)|^2 I*(r_o, \omega),$$

which implies that the reversed signals re-transmitted through the medium will "focus" the enhanced energy (with gain K) back to the original source position with no change in phase because of the magnitude-squared channel Green's function, that is, $$\hat{I}(r_o, \omega) \propto K(\omega)I(r_o, \omega),$$ (Equation 4)

precisely demonstrating the broadband version of phase conjugation. Clearly, this relation is more complicated, and more sophisticated representations include sensor transfer functions, noise, etc. Knowledge of the detailed channel Green's function is not required (no modeling) explicitly. This simple property can be extended to random media. Next the applicants describe how the TR principle can be applied to the communications problem.

The basic communications problem has been solved based on the following well-known formulation. The detection of a transmitted information sequence can be transformed to the problem of maximizing the output signal-to-noise ratio, $SNR_{out}$, at the receiver of a communications system. The underlying system model for the communications problem is given by $$z(t) = s_{out}(t) + n_{out}(t) = g(r;t) * [s(t) + n(t)],$$ (Equation 5)

for $z(t)$, the noisy measurement, $s_o(t)$, the output signal consisting of the convolution of $s(t)$, the transmitted signal (information) and $g(r;t)$, the spatio-temporal channel Green's function response. Note here we use $g(r;t)$ instead of $C(r;t)$ the previous discussion. The output noise, $n_{out}(t)$, is also the convolution of the input noise, $n(t)$, an additive random (white) zero mean, noise of variance, $\sigma_n^2$. The matched-filter problem based on the model of Eq. 5 is given a "known" signal, $s(t)$, in additive white noise, find the filter response, f (t), that maximizes the $SNR_{out}$ defined by $$\max_f SNR_{out} \equiv \frac{\xi_{s_{out}}}{E\{n_{out}^2(t)\}} = \frac{|f(t) * s(t)|^2}{\sigma_{n_{out}}^2},$$ (Equation 6)

for $\xi_{s_{out}}$ defined as the output signal energy. For time reversal, the matched-filter in additive white noise is identical to that posed above with a "known" Green's function of the channel medium replacing the known signal. The channel Green's function, $g(r, r_o;t)$, is the result of a point-to-point communication link between a station (source) at $r_o$ to a master station (receiver) at r. In this case, the matched-filter solution is found by maximizing, $SNR_{out}$, leading to the modified numerator $$|f(t) * g(r, r_o; t)|^2 \leq \xi_f \times \xi_g,$$ (Equation 7)

that is satisfied with equality at some time T, if $$f(t) = g(r, r_o; T-t).$$ (Equation 8)

Thus, for T/R, the optimal matched-filter solution is the time-reversed channel Green's function from the link station-to-master station (source-to-receiver) or visa versa. Comparing these results with the usual matched-filter solution above, the Green's function of the channel is reversed rather than the transmitted replicant signal. Note that since T/R theory requires reciprocity, these results are valid for both transmission and reception, that is, $g(r,r_o;T-t) \Leftrightarrow g(r_o,r;T-t)$. Note also that when an array is included to sample the spatial field or transmit a wave, then these results include the focus at link station (source) position, $r_o$, yielding the optimal, spatio-temporal matched-filter solution, $g(r_l,r_o;T-t)$ at sensor position, $r_l$.

With this T/R information in hand, the communications system 100 utilizes a set of realizations of the T/R communications system that can be implemented to solve the point-to-point communications problem. The T/R operation can be performed either on transmission or reception using the channel Green's function or a known pilot signal. Generically, the basic T/R communication system is shown in FIG. 1 and is embodied by the system 100. Here the information signal is transmitted by transmitter 103 of the T/R transmitter system 101 into the channel medium 104 where it is available for the T/R receiver system 102 at 105. It is then digitized in receiver 106 for T/R processing in 107 where the transmitted information signal at 103 is recovered at the link station at 108.

The first realization is probably the most advantageous by performing T/R during transmission thereby mitigating the effects of the medium directly. Mathematically, the following measurements are defined as: the pilot and the information. The pilot measurement is defined as $$z_p(t) = g(r;t) * p(t), \qquad \text{[Pilot] (Equation 9)}$$

where $z_p$ is the pilot measurement, which can also be contaminated with additive noise; g is the spatio-temporal Green's function of the channel; and, p is the known, transmitted pilot signal. The purpose of the pilot in this case, as well as that of equalization, is to estimate the Green's function which is used in the final receiver design to mitigate the distortion effects created by the channel medium and unknown transfer characteristics of the measurement system. The pilot is not only used to estimate the Green's function, but also to implement the receiver by convolution as will be discussed below.

The information measurement is defined by $$z_i(t) = g(r;t) * i(t), \qquad \text{[Information] (Equation 10)}$$

where $z_i$ is the information measurement; and, i is the transmitted information signal.

Realizations of the T/R receiver on transmission follows directly from linear systems theory and the following two cases are considered: one using the Green's function of the channel medium, and one using the pilot measurement.

Figure 2:
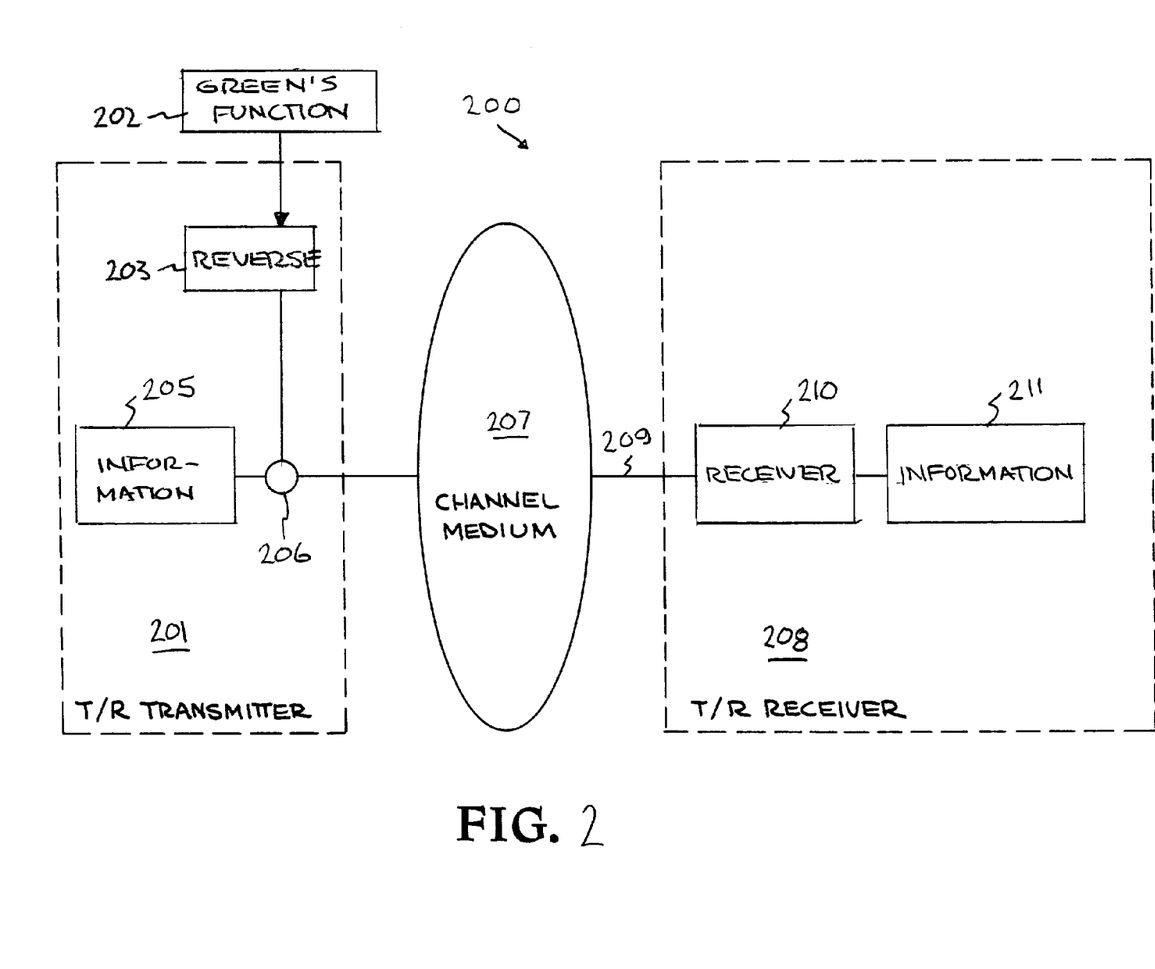
FIG. 2 illustrates another embodiment of a communications system using time reversal.

The T/R Transmission Based Receiver 200 using the channel Green's function on transmission is shown in FIG. 2 and is Realization No. 1 of the set of T/R receivers. For the T/R Transmitter 201, the channel Green's function 202 is first estimated, reversed digitally 203, and convolved 206 with the information signal 205 for transmission through the channel medium 207. On reception, the input 209 to the T/R receiver is defined as $Z_{igX}(t)$ with the subscript representing the information signal (i), convolved with the Green's function, (g), on transmission (X) is digitized (A/D converter) in the receiver 210 of the T/R Receiver 208. Therefore, we have that the measured, digitized signal $$z_{igX}(t) = z_i(t) * \tilde{g}(r;-t) = g(r;t) * \tilde{g}(r;-t) * i(t) = C_{gg}(t) * i(t), \qquad \text{(Equation 11)}$$

where $C_{gg}(t)$ is the correlation function and therefore, the output 211 of the T/R receiver is simply $$R_{igX}(t) = z_{igX}(t). \qquad \text{(Equation 12)}$$

Clearly, if $C_{gg}(t) \sim C_{gg}(t)$ and $C_{gg}(t)$ is impulsive, then i(t) is recovered directly by this realization. However, in reality, we have the autocorrelation function, $C_{gg}(t)$, that acts as a window function filtering or smearing i(t). It is also interesting to note with this particular realization that if a sensor array replaces the single sensor transmitter used for point-to-point communications, then the optimal spatial-temporal matched-filter is additionally achieved with the added gain in SNR afforded by the array as well as the focusing capability of the T/R operation. Next we consider a second realization using a similar structure.

Figure 3:
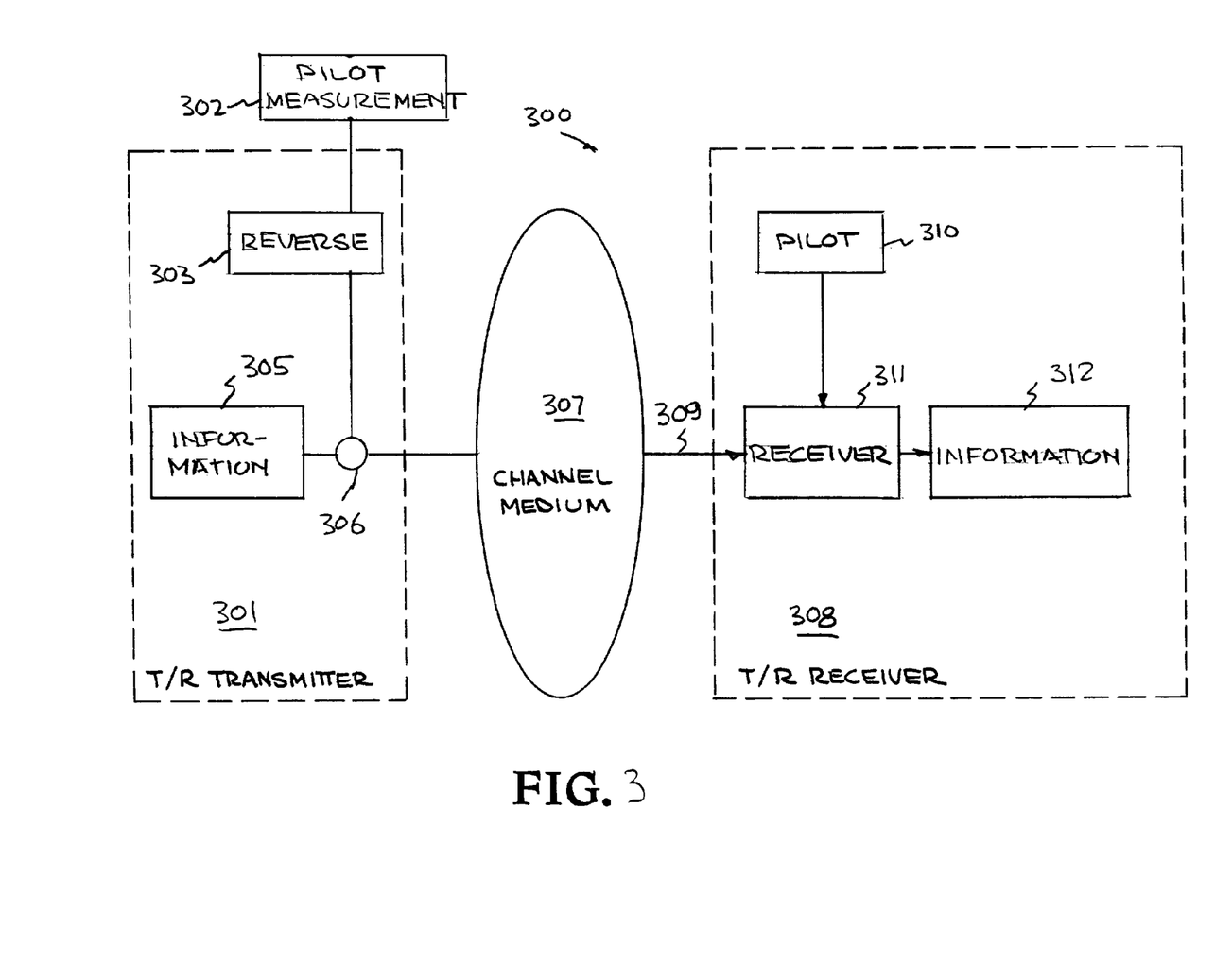
FIG. 3 illustrates another embodiment of a communications system using time reversal.

The T/R Transmission Based Receiver 300 using the pilot measurement on transmission is shown in FIG. 3 and is Realization No. 2 of the set of T/R receivers. It is an alternate realization of the T/R receiver using the pilot measurement. Here for the T/R Transmitter 301 a known pilot signal measurement 302 is selected to excite the channel medium providing, $z_{ip}(t)$, which is reversed 303 and convolved 306 with the information signal 305 on transmission through the channel medium 307 to generate, $z_{ipX}(t)$, as input 309 to the T/R receiver 310 defined by $$z_{ipX}(t) = z_i(t) * z_p(-t) = C_{gg}(t) * p(-t) * i(t). \qquad \text{(Equation 13)}$$

Convolution 311 with the known pilot signal 310, p(t), is therefore necessary to recover the information at the output 312 of the receiver given by $R_{ipr}(t)$, that is, $$R_{ipX}(t) = z_{ipX}(t) * p(t) = C_{gg}(t) * C_{pp}(t) * i(t), \qquad \text{(Equation 14)}$$

where again if both $C_{gg}$ and $C_{pp}$ are impulsive, i(t), is recovered directly. Realistically, we can think of the information signal as being filtered or smeared by both.

Next realizations of T/R receiver on reception are considered. Again two cases are considered: one with the Green's function and one with the pilot measurement.

Figure 4:
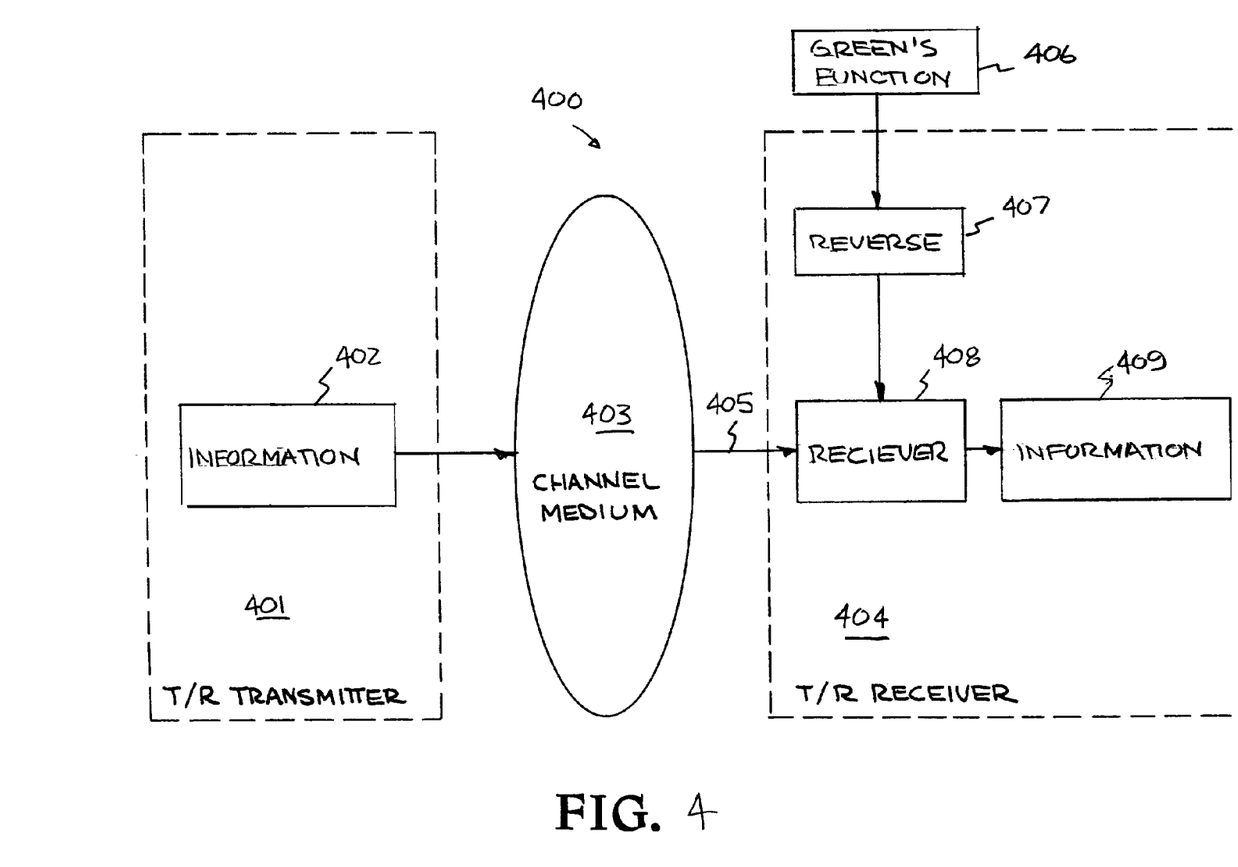
FIG. 4 illustrates another embodiment of a communications system using time reversal.

Realization No. 3 of the set of T/R receivers is the T/R Reception Based Receiver 400 with channel Green's function on reception is shown in FIG. 4. The T/R Transmitter 401 transmits the information signal 402 through the channel medium 403 resulting in the received measurement 405. On reception, the estimated Green's function 406 is reversed 407 and convolved 408 with the receiver input 405, $z_i(t)$, to give the T/R receiver 404 output 409 as $$R_{igR}(t) = z_i(t) * g(r;-t) = C_{gg}(t) * i(t), \qquad \text{(Equation 15)}$$

which is mathematically identical to $R_{igX}(t)$ with the exception that the mitigation of the channel medium 403 is performed on reception. This realization is subject to more uncertainty and noise created by the medium itself or external noise on transmission through the medium. Finally, we consider the case of using the pilot measurement on reception.

Figure 5:
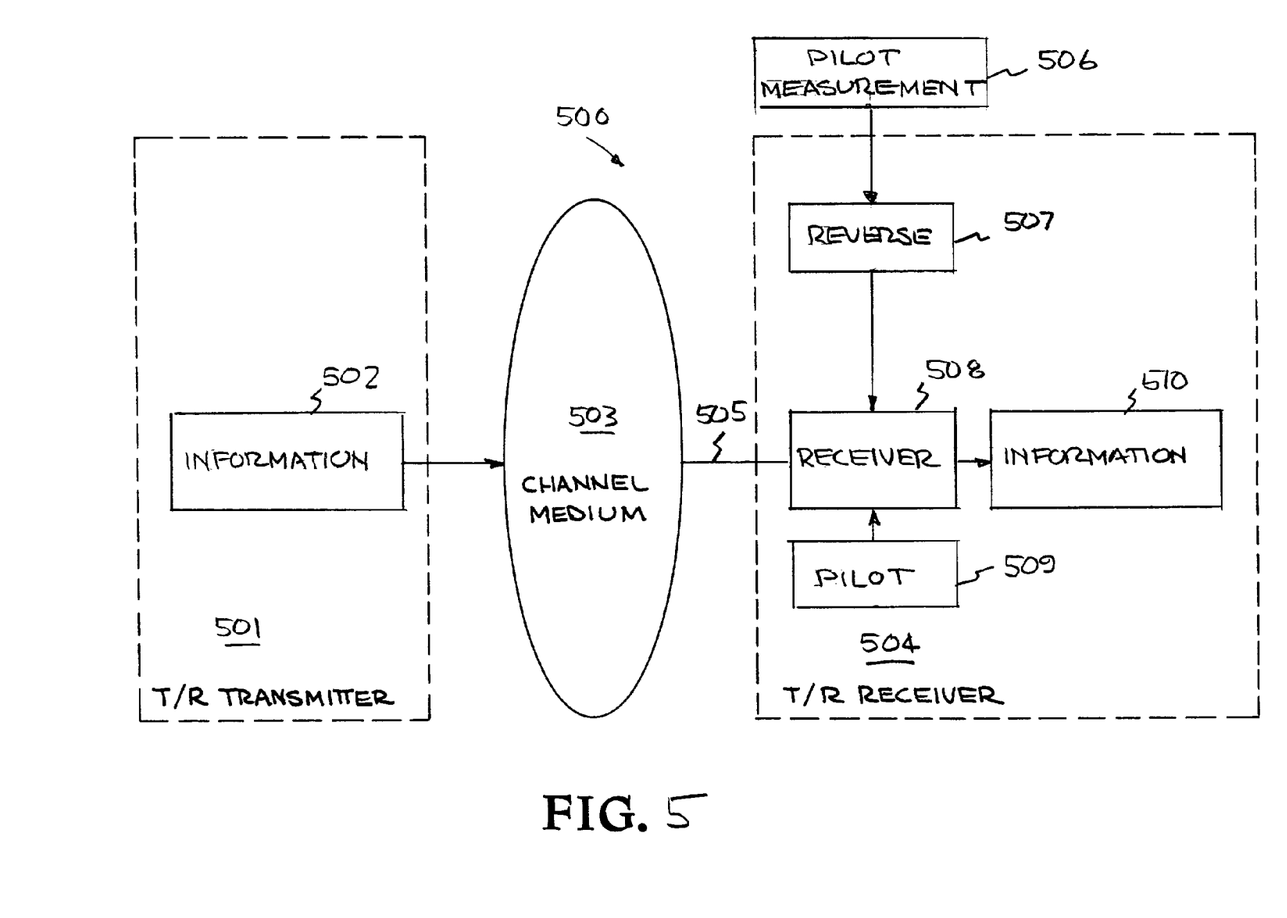
FIG. 5 illustrates another embodiment of a communications system using time reversal.

Realization No. 4 of the set of T/R receivers is the T/R Reception Based Receiver 500 with pilot measurement 509 on reception is shown in FIG. 5. As in the previous case, the T/R Transmitter 501 transmits the information signal 502 through the channel medium 503 resulting in the received measurement 505. We start with the receiver input 505 and convolve 508 it with the reversed 507 pilot measurement 506 as well as the known pilot signal 509 to generate the T/R receiver 504 output 510, $R_{ipR}(t)$, where $$R_{ipR}(t) = z_i(t) * z_{ip}(-t) * p(t) = C_{gg}(t) * C_{pp}(t) * i(t), \qquad \text{(Equation 16)}$$

which is mathematically equivalent to $R_{ipX}(t)$, but with the potential uncertainty problems discussed in Realization No. 3 above.

One of the critical steps in the implementation of any communications receiver is how it "equalizes" or attempts to remove the deleterious effects of mitigating the channel medium (Green's function). For Realization No. 1 and No. 3, the estimated Green's function is required before the receiver can be constructed. Here the applicants discuss some approaches to estimate the Green's function from noisy received data. As discussed previously, the channel Green's function is an integral part of the two T/R receiver realizations. It can be estimated from the pilot measurement of Eq. 9 and is similar to the operations used for equalization, but is much better conditioned numerically for solution, since the forward rather than the inverse filter is required for T/R. The estimated Green's function is used in the realizations to mitigate the distortion effects created by the channel medium and unknown transfer characteristics of the measurement system. We describe two methods of obtaining the required pilot measurements in FIG. 6. Since reciprocity holds, the pilot can be transmitter from either the transmission or reception side of the implementation to obtain the measured data for processing.

The estimate, $\hat{g}(r;t)$, is obtained using the optimal Wiener solution obtained from the pilot measurement by solving $$\min_g J = \quad \text{(Equation 17)}$$
$$E\{\varepsilon^2\} \text{ for } \varepsilon(t) \equiv z(t) - \hat{z}(t) = z(t) - \hat{g}(r;t) * p(t),$$

and $\in$ is defined as the output error. The solution of this problem leads to the well-known Wiener filter given by $$\hat{g} = C_{pp}^{-1} c_{zp}, \quad \text{(Equation 18)}$$

where $C_{pp}$ is a M×M correlation matrix and $c_{zp}$ is a M-cross correlation vector with $$\hat{z}(t) = \hat{g}(r;t) * p(t) = \sum_{m=0}^{M-1} \hat{g}(r;m)p(t-m) = \hat{g}^T p(t), \quad \text{(Equation 19)}$$

for $$\hat{g}^T = [\hat{g}(r;0) \ldots \hat{g}(r;M-1)] \text{ and } p^T(t) = [p(t) \ldots p(t-M+1)].$$

Since the correlation matrix of Eq. 18 is Toeplitz, we choose to use the Levinson-Wiggins-Robinson (LWR) recursion to efficiently perform the inversion (order $M^2$).

Pragmatically, a more efficient method to estimate the Green's function is using a chirp input to excite the channel medium. Here the chirp is simply a frequency-modulated signal that is swept over the presumed bandwidth of the channel. It is well-known that the autocorrelation of a chirp closely approximates and impulse; therefore, when used in the T/R Receiver Realizations No. 2 (FIG. 3) and No. 4 (FIG. 5) the resulting outputs are much simpler and produce the desired results.

Figure 6:
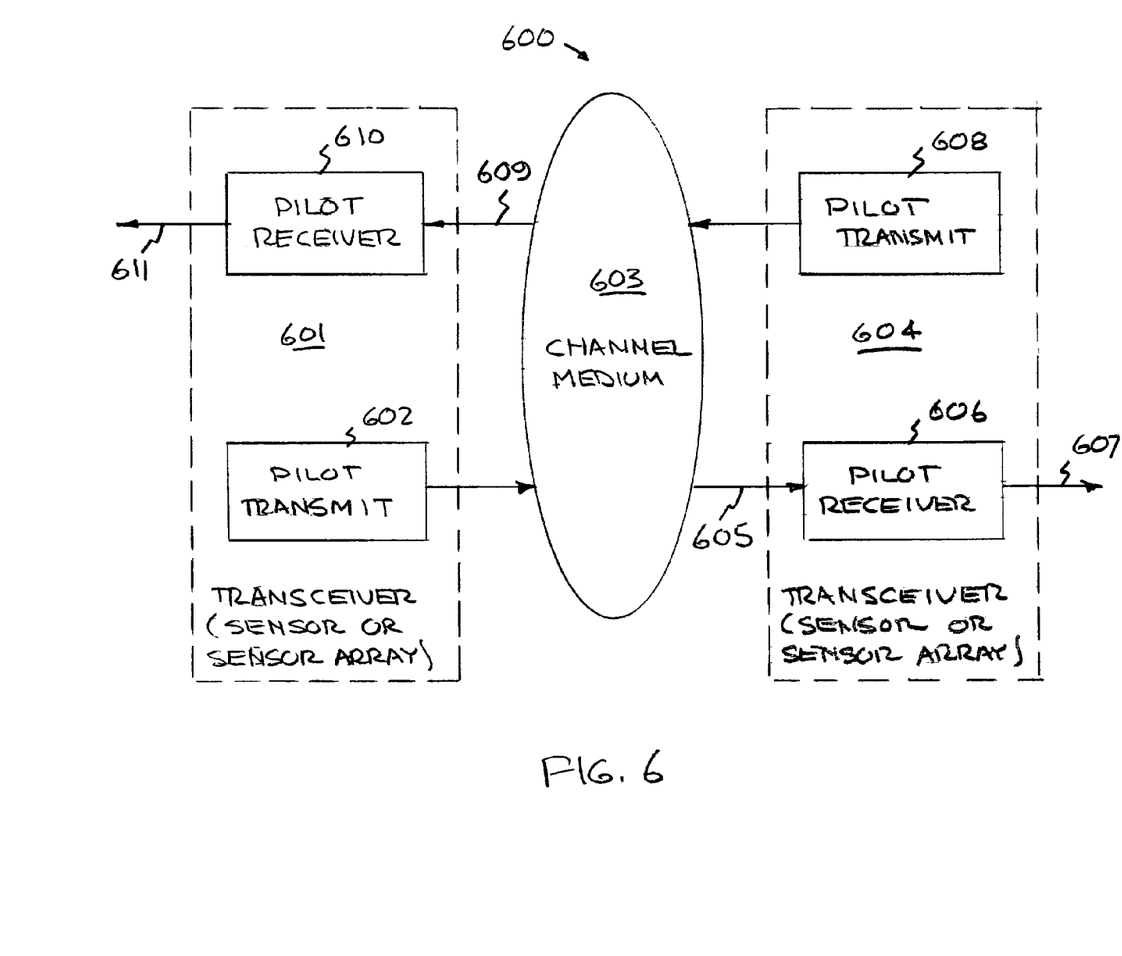
FIG. 6 illustrates another embodiment of a communications system using a pilot signal.

The implementation of the "pilot measurement" data acquisition system 600 is shown in FIG. 6. On the transmission side, Transceiver 601 transmits the pilot 602 through the channel medium 603 to the reception Transceiver 604 where the measurement 605 is digitized in the Pilot receiver 606 and output 605 for further processing at the Link station. Depending on the application, it may be desirable to have the Link station perform the pilot transmission. In this case the pilot 608 is transmitted from the Transceiver 604 through the medium 603 where the measurement 609 is received on Transceiver 601 is digitized in the Pilot receiver 610 and output 611 for processing at the Master station.

Referring again to FIG. 1, additional details of the components of the system 100 will be described. The T/R transmitter 101 includes a Transmit System 103. The Transmit System 103 comprises a code generator, digitizers (A/D and D/A), amplifier, microprocessor (convolution), reverser (FIFO shift register) and other data (e.g., pilot, pilot measurement, etc.). Channel Medium 104 is the channel over which the information is to be sent and is characterized by its Green's function. The T/R Receiver 102 comprises of the Receive System 106 and T/R Equalizer 107. The Receive System 106 comprises an amplifier and filter, digitizer and matched-filter for synchronization. The T/R Equalizer 107 comprises a microprocessor (convolution), reverser (FIFO shift register) and other data (e.g., pilot, pilot measurement, etc.)

Referring again to FIG. 1, an embodiment of a basic T/R Communication system 100 using any of the possible realizations discussed above or for that matter any realization using the time reversal approach consists of a T/R Transmitter 101 including a Transmit system 103 which may include the estimated Green's function in its implementation, a digitizer, and an information code generator as well as a microprocessor to perform convolution on transmission 103 when required. After the information code is transmitted 103 from the T/R Transmitter 101 through the channel medium 104 it is received 105 on the T/R Receiver 102, digitized and processed (bandpass filtered) 106 and the processed using any device (e.g., microprocessor) to perform the receiver functions 107 producing the output information 108.

Figure 7:
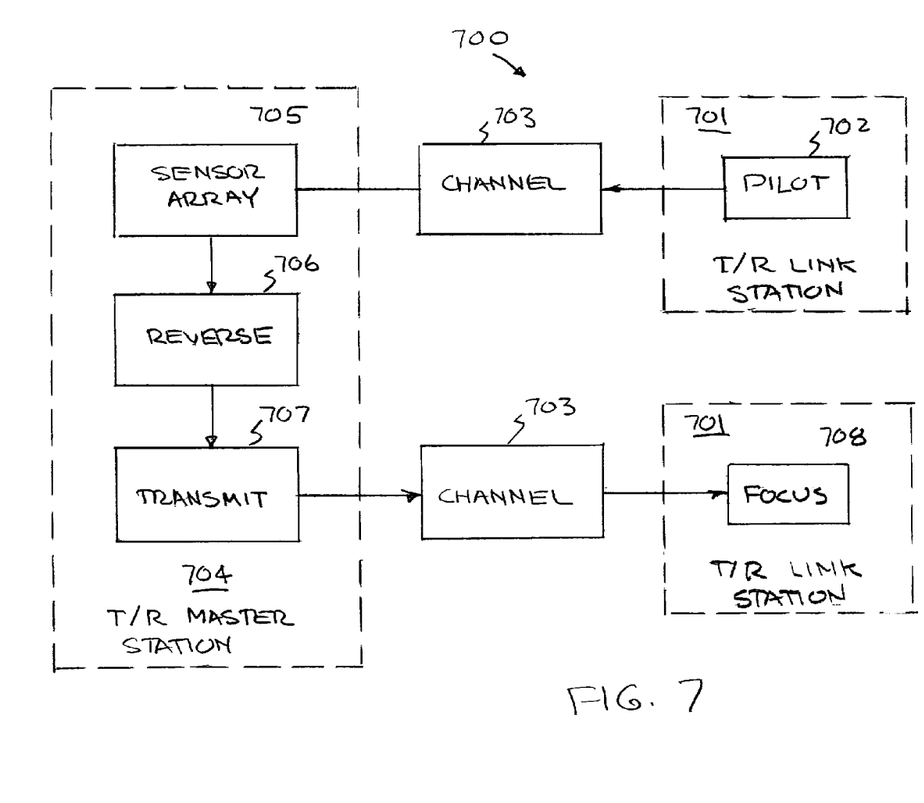
FIG. 7 illustrates another embodiment of a communications system using time reversal arrays.

With this information in mind consider the operation of the time-reversal receiver in a battlefield or maybe even more hostile, a securities exchange environment, the ability to focus through the medium is an interesting and fundamental property of the TRSP. Next we discuss the capability of the T/R approach using a T/R communications array 700 to provide focusing 708 and gain using the communications channel 703 directly (see FIG. 7). Initially, a Link station 701 pilot signal 702 is transmitted or broadcast with a known (a priori) code from position $r_o$. It propagates through the channel medium Green's function, $C(r_l, r_o;t)$ 703, to an L-element sensor array 705 located at the T/R Master station 704 and is received 705 on the $l^{th}$ channel transceiver as $T(r_l;t)$, that is, $$T(r_l;t) = C(r_l,r_o;t) * p(r_o;t) \quad \text{(Equation 20)}$$

or equivalently in the temporal frequency domain $$T(r_l;\omega) = C(r_l,r_o;\omega) \times P(r_o;\omega) \quad \text{(Equation 21)}$$

Next the signal received on each channel 705 is time-reversed 706 and retransmitted 707 back to the Link station position 701 as $$\hat{p}(r_o;t) = C(r_o,r_l;t) * T(r_l;-t) = C(r_o,r_l;t) * [C(r_l,r_o;-t) * p(r_o;-t) \quad \text{(Equation 22)}$$

Taking Fourier transforms and assuming reciprocity holds $(C(r_o,r_l;t) = C(r_l,r_o;t))$, we have $$\hat{P}(r_o;\omega) = C(r_o,r_l;\omega)C^*(r_l,r_o;\omega)P^*(r_o;\omega) = |C(r_o;\omega)| = |C(r_o;\omega)| \quad \text{(Equation 23)}$$

From time-reversal theory this relation states that the reversed signal 706 transmitted from the $l^{th}$ sensor 707 propagates through the channel medium 703 and focuses energy back 708 to the Link station 701 at position $r_o$.

Extending this over the entire array implies that we can write the channel 703 as an L-vector, $\underline{C}(r_o;t) \in C^{L \times 1}$ and $\underline{T}(t) \in R^{L \times 1}$. Therefore, $$\underline{T}(t) = \underline{C}(r_o;t) * p(r_o;t) \qquad \text{(Equation 24)}$$

and equivalently $$\underline{T}(\omega) = \underline{C}(r_o;\omega) \times P(r_o;\omega) \qquad \text{(Equation 25)}$$

Following the same arguments as before in the temporal frequency domain, we obtain $$\hat{P}(r_o;\omega) = \underline{C}'(r_o;\omega) \times \underline{C}(r_o;\omega) P(r_o;\omega) \qquad \text{(Equation 26)}$$

or $$\hat{P}(r_o;\omega) = |\underline{C}(r_o;\omega)|^2 P(r_o;\omega) \qquad \text{(Equation 27)}$$

implying that not only do we focus energy 708 back to the Link station position, but we also increase the overall gain 708 by the square of the channel medium transfer function 703. It can be seen that the channel 703 actually enhances the SNR on focus 708. Thus, the channel link can be accomplished using the focusing property of time reversal.

Next assume that a coded message, $\underline{i}(t)$, is transmitted from the Master station transceiver array elements through the channel to the Link station receiver at $r_o$, then $$R(r_o;t) = \underline{C}^T(r_o;t) * \underline{i}(t) \qquad \text{(Equation 28)}$$

or equivalently in the frequency domain $$R(r_o;\omega) = \underline{C}^T(r_o;\omega) \times \underline{I}(\omega) \qquad \text{(Equation 29)}$$

where R is defined as the forward propagation relation. Next suppose the Link station "repeats" the received code and modifies it by some weighting function, $a(r_o;t)$, then the backward propagation relation to the transceiver array is $$\underline{T}(\omega) = \underline{C}(r_o;\omega) A(r_o;\omega) R(r_o;\omega) = [\underline{C}(r_o;\omega) A(r_o;\omega) \\ \underline{C}^T(r_o;\omega)] \underline{I}(\omega) \qquad \text{(Equation 30)}$$

Thus, the transfer matrix, $K \in C^{L \times L}$ from the Link station to the Master station transceiver array is defined by $$K(\omega) \equiv \underline{C}(r_o;\omega) A(r_o;\omega) \underline{C}^T(r_o;\omega) \qquad \text{(Equation 31)}$$

with corresponding input-output relation $$\underline{T}(\omega) = K(\omega) \times \underline{I}(\omega) \qquad \text{(Equation 32)}$$

Following Prada [ ], it is possible to focus transmitted energy exclusively on the Link station without leaking energy on other stations by using the time-reversed channel medium response Green's functions, $C_j(r_o;-t)$. Therefore, the pressure-field received at $r_o$ is $$R(r_o;\omega) = \underline{C}^T(r_o;\omega) \times \underline{C}^*(r_o;\omega) = \sum_{l=1}^{L} |\underline{C}(r_o;\omega)|^2 \qquad \text{(Equation 33)}$$

Next, let $\underline{C}^*(r_o;\omega)$ (obtained from pilot signal transmission of FIG. 6) be the input vector driving the transceiver array, propagating back to the array, then $$\underline{T}(\omega) = K(\omega) \times \underline{C}^*(r_o;\omega) = A(r_o;\omega) \underline{C}(e_o;\omega) \times \underline{C}^T(r_o;\omega) \times \\ \underline{C}^*(r_o;\omega) \qquad \text{(Equation 34)}$$

and therefore, $$\underline{T}(\omega) = A(r_o;\omega) \times \underline{C}(r_o;\omega) \qquad \text{(Equation 35)}$$

-continued $$\sum_{l=1}^{L} |\underline{C}(r_o;\omega)|^2 = \left[ A(r_o;\omega) \sum_{l=1}^{L} \left| \underline{C}(r_o;\omega) \right|^2 \right] \times \underline{C}(r_o;\omega)$$

which implies that $$K(\omega) \times \underline{C}^*(r_o;\omega) = \lambda(\omega) \times \underline{C}(r_o;\omega) \qquad \text{(Equation 36)}$$

with $$\lambda(\omega) \equiv A(r_o;\omega) \sum_{l=1}^{L} \left| \underline{C}(r_o;\omega) \right|^2.$$

Multiplying both sides of Eq. 36 by, $K'(\omega)$, then $$[K'(\omega) K(\omega)] \underline{C}^*(r_o;\omega) = \lambda^2(\omega) \underline{C}^*(r_o;\omega) \qquad \text{(Equation 37)}$$

which is an eigen-equation with eigenvalue, $\lambda^2(\omega)$ and corresponding eigenvector, $\underline{C}^*(r_o;\omega)$, since the product $K'(\omega)K(\omega)$ is Hermitian. This relation shows that since $\underline{C}^*(r_o;\omega)$ is an eigenvector of $K'(\omega)K(\omega)$, then therefore, it is also an eigenvector of $K(\omega)$ (e.g. see Lawson [] Theorem 4.1). Thus, the eigenvector signal, $\underline{C}^*(r_o;\omega)$, transmitted through the channel medium will focus only on the Link station at $r_o$.

Figure 8:
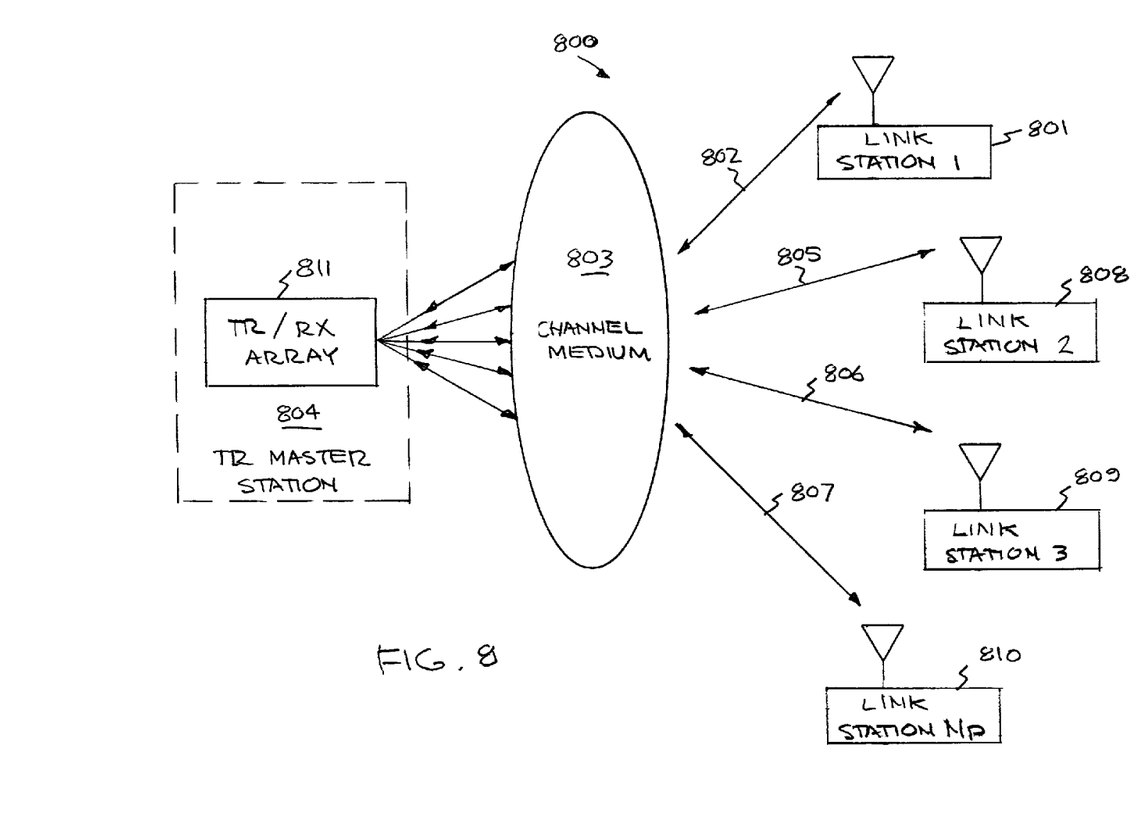
FIG. 8 illustrates another embodiment of a communications system using time reversal arrays.

This property can easily be shown by the system 800 depicted in FIG. 8 by extending the problem to include multiple Link stations, say $N_p$, each one (801, 808, 809, 810) identified first by individual coded messages (802, 805, 806, 807) following the same procedure as Prada []. In this case the channel medium vector 803 becomes a $N_p \times L$ matrix, $C(r;\omega)$ and the weight becomes a set of weights, one for each Link station (801, 808, 809, 810), defined by a diagonal matrix, $A(r_o;\omega) \in R^{N_p \times N_p}$. The transfer matrix in the multi-station case becomes $$K(\omega) = C^T(r;\omega) \times A(r;\omega) \times C(r;107) \qquad \text{(Equation 38)}$$

and the corresponding input-output relation remains the same as before. The forward propagation 811 to all Link stations (801, 808, 809, 810) is now given by $$\underline{R}(\omega) = C(r;\omega) \times \underline{I}(\omega) \qquad \text{(Equation 39)}$$

Assuming single scattering, the back propagation 811 is given by $$\underline{T}(\omega) = C^T(r;\omega) A(r;\omega) \underline{R}(r;\omega) = C^T(r;\omega) A(r;\omega) [C(r;\omega) \\ \underline{I}(\omega)] = K(\omega) \times \underline{I}(\omega) \qquad \text{(Equation 40)}$$

As before let the input signal 811 be an eigenvector from the $j^{th}$ station, $\underline{C}_j(r;-t)$ or $\underline{C}_j^*(r;\omega)$, then back propagating 811 gives $$\underline{T}(\omega) = K(\omega) \times \underline{C}_j^*(\omega) = C^T(r;\omega) A(r;\omega) C(r;\omega) \times \underline{C}_j^*(r;\omega) \qquad \text{(Equation 41)}$$

If ideally separated scatterers are assumed, then A is a diagonal matrix and the $\underline{C}_j^*(r;\omega)$ are orthogonal, therefore multiplying out the last three terms in Eq. 41 gives a $N_p$-vector $$A(r;\omega)C(r;\omega) \times \underline{C}_j^*(\omega) = \begin{bmatrix} A_{11}(r;\omega)\underline{C}_1^T(r;\omega)\underline{C}_j^*(r;\omega) \\ \vdots \\ A_{N_pN_p}(r;\omega)\underline{C}_{N_p}^T(r;\omega)\underline{C}_j^*(r;\omega) \end{bmatrix}$$

but since $\underline{C}_m^T(r;\omega)\underline{C}_n^*(r;\omega)=0$ for $m \neq n$, then only the $j^{th}$-th column survives with element $$\lambda_j(\omega) \equiv (A(r;\omega)C(r;\omega) \times \underline{C}_j^*(r;\omega))\underline{e}_j = \quad \text{(Equation 42)}$$
$$A_{jj}(r;\omega) \sum_{l=1}^{L} |C_{jl}(r;\omega)|^2$$

where $\underline{e}_j$ is a $N_p$-unit vector with unity at the $j^{th}$-row. Multiplying the Eq. 42 using the orthogonality property and the unit vector gives $$\underline{T}(\omega) = C^T(r;\omega)\underline{e}_j\lambda_j(\omega)\underline{C}_j(r;\omega) \quad \text{(Equation 43)}$$

with $\underline{C}_j(r;\omega)$ the $j^{th}$-column L-vector of C and therefore $$K(\omega)\underline{C}_j^*(r;\omega) = \lambda_j(\omega)\underline{C}_j(r;\omega) \quad \text{(Equation 44)}$$

Figure 9:
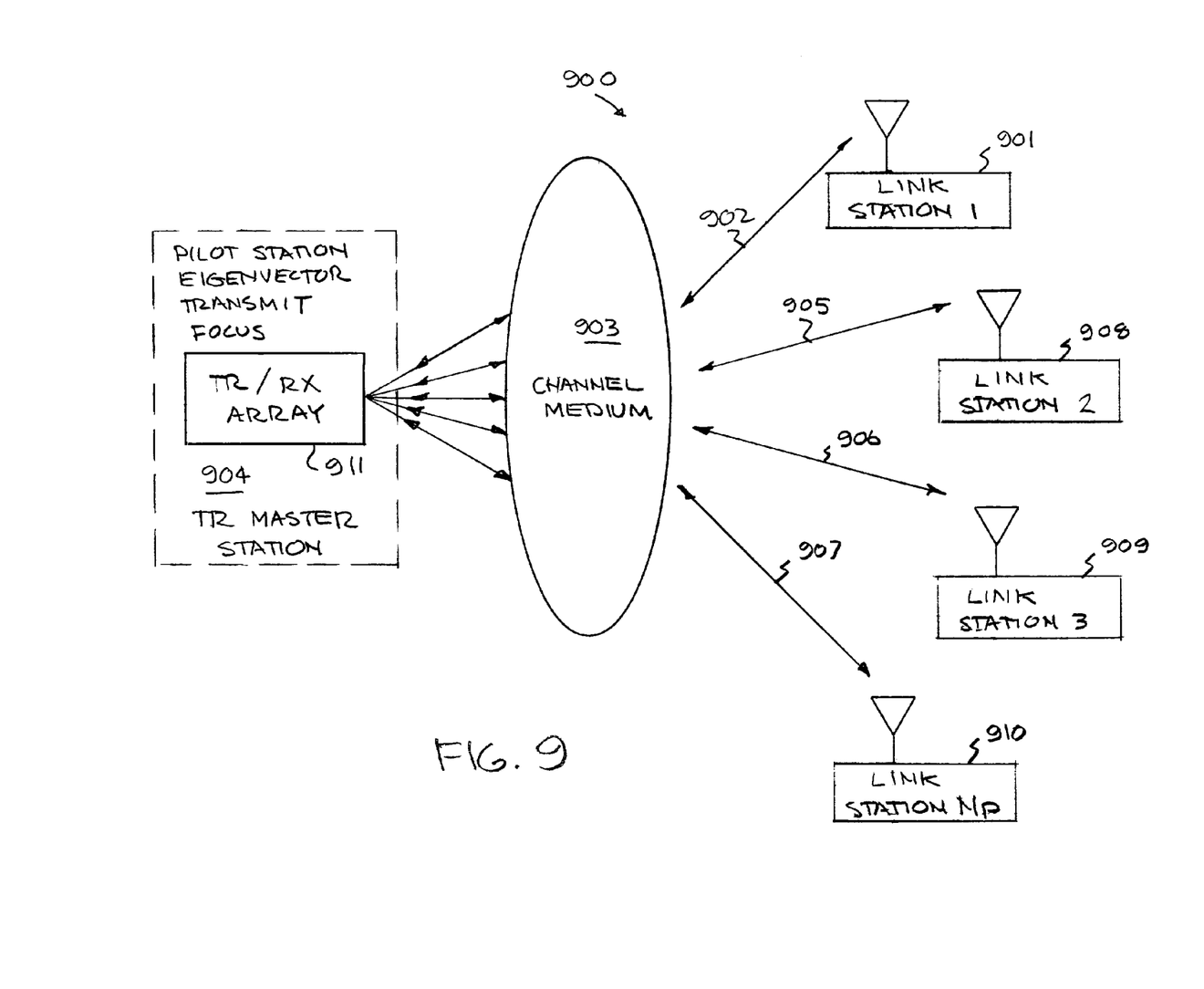
FIG. 9 illustrates another embodiment of a communications system using time reversal arrays.

As before in Eq. 18, pre-multiplying both sides yields the eigen-equation $$[K^T(\omega)K(\omega)]\underline{C}_j^*(r;\omega) = \lambda_j^2(\omega)\underline{C}_j^*(r;\omega) \quad \text{(Equation 45)}$$

with eigenvalue, $\lambda_j^2(\omega)$, and eigenvector, $\underline{C}_j^*(r;\omega)$, also an eigenvector of K. What this result implies is that for ideally separated stations, it is possible to transmit codes to each individually assuring complete isolation security between stations as well as any other listeners. It is also interesting to note that to solve this problem the singular value decomposition of the Hermitian matrix, $K^T K$ can be employed, that is $$[K^T(\omega)K(\omega)] = E(\omega) \times \Lambda(\omega) \times E'(\omega) \quad \text{(Equation 46)}$$

where the L×L-matrix, $\Lambda = \text{diag}[\lambda_1^2(\omega) \ldots \lambda_{N_p}^2(\omega) \, 0 \ldots 0]$ of rank $N_p$ contains the singular values (squared-eigenvalues). Using the Link station eignenvectors directly then eigenvector station focusing is shown by the system 900 of FIG. 9. The Link stations (901, 908, 909, 910) are identified first by individual coded messages using their individual eigenvectors (902, 905, 906, 907) "learned" from the medium 903 following the same procedure as Prada [ ]. Using the eigenvectors to establish the communications link between Master 904 and Link stations (901, 908, 909, 910) coded message signals are transmitted from the transceiver array 911 through the medium 903 and focusing on the individual Link station thereby enabling secure communications which can easily be altered by simply selecting a new frequency, say $\omega_i$, which corresponds to a new singular value, $\lambda_j(\omega_i)$, $i=1, \ldots, N_{freq}$; and $l=1, \ldots, N_p$, and therefore, a new eigenvector for that particular station becomes $\underline{E}_j^*(\omega_i)$ 905. This is one of the main advantages of using T/R focusing and eigen-decomposition techniques especially where secure communications are required.

Note a few of the interesting properties of the time-reversal communications solution developed are: (1) individual stations are uniquely identified by their eigenvectors at a given temporal frequency; (2) each station has its own unique propagation path which is completely captured by its corresponding eigenvector, $\underline{C}_j^*(r;\omega)$; (3) the $j^{th}$-singular values of $K^T K$ are related to the $j^{th}$-eigenvector or $j^{th}$-column vector of E, that is, $\{\lambda_j^2(\omega_i), \underline{E}_j^*(r;\omega_i)\}$ are functions of temporal frequency, $\omega$.

As described above, the present invention provides a communication system that comprises means for transmitting a signal through a channel medium, means for receiving the signal, means for digitizing the signal, and means for time-reversing the digitized signal. In one embodiment the means for time-reversing the digitized signal is operatively connected to the transmitter. In one embodiment the means for time-reversing the digitized signal is operatively connected to the receiver. In one embodiment the means for digitizing the signal is operatively connected to the transmitter. In one embodiment the means for digitizing the signal is operatively connected to the receiver. In one embodiment the means for time-reversing the digitized signal and the means for digitizing the signal are operatively connected to the transmitter. In one embodiment the means for time-reversing the digitized signal and the means for digitizing the signal are operatively connected to the receiver.

While the invention may be susceptible, to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A communication system apparatus for transmitting a transmitted signal through a channel medium wherein the channel medium may create channel distortions, comprising:
   a pilot signal transmitter adapted to transmit a pilot signal through the channel medium,
   a pilot signal receiver adapted to receive said pilot signal that has passed through the channel medium,
   a transmitter adapted to transmit the transmitted signal through the channel medium,
   a receiver adapted to receive the transmitted signal that has passed through the channel medium,
   a digitizer that digitizes the transmitted signal producing a digitized signal, and
   a point-to-point time-reversal signal processor adapted to time-reverse said digitized signal wherein said digitizer and said time-reversal signal processor utilize said pilot signal to remove the channel distortions from the transmitted signal.

2. The system of claim 1 wherein the channel medium comprises air and wherein said pilot signal transmitter is adapted to transmit said pilot signal through said air wherein said transmitter is adapted to transmit said transmitted signal through said air.

3. The system of claim 1 wherein the channel medium comprises earth and wherein said pilot signal transmitter is adapted to transmit said pilot signal through said earth wherein said transmitter is adapted to transmit said transmitted signal through said earth.

4. The system of claim 1 wherein the channel medium comprises water and wherein said pilot signal transmitter is adapted to transmit said pilot signal through said water wherein said transmitter is adapted to transmit said transmitted signal through said water.

5. The system of claim 1 wherein the channel medium comprises tissue and wherein said pilot signal transmitter is adapted to transmit said pilot signal through said tissue wherein said transmitter is adapted to transmit said transmitted signal through said tissue.

6. The system of claim 1 wherein the channel medium comprises metal and wherein said pilot signal transmitter is adapted to transmit said pilot signal through said metal wherein said transmitter is adapted to transmit said transmitted signal through said metal.

7. The system of claim 1 wherein the channel medium comprises non-metal and wherein said pilot signal transmitter is adapted to transmit said pilot signal through said non-metal wherein said transmitter is adapted to transmit said transmitted signal through said non-metal.

8. The system of claim 1 including a signal processor adapted to estimate Green's function of the channel medium.

9. The system of claim 1 including a signal processor adapted to determine Green's function of the channel medium.

10. The system of claim 1 wherein said pilot signal transmitter is a transceiver for transmitting a pilot signal through the channel medium.

11. The system of claim 1 including means for transmitting a pilot signal through the channel medium, means for estimating a pilot signal as it would be transmitted through the channel medium, and means for comparing said pilot signal and said estimated pilot signal.

12. The system of claim 1 wherein said time-reversal signal processor is operatively connected to said transmitter.

13. The system of claim 1 wherein said time-reversal signal processor is operatively connected to said receiver.

14. The system of claim 1 wherein said digitizer is operatively connected to said transmitter.

15. The system of claim 1 wherein said digitizer is operatively connected to said receiver.

16. The system of claim 1 wherein said time-reversal signal processor and said digitizer are operatively connected to said transmitter.

17. The system of claim 1 wherein said time-reversal signal processor and said digitizer are operatively connected to said receiver.

18. The system of claim 1 including a multiplicity of at least one of said transmitters and receivers.

19. The system of claim 1 including a multiplicity of link stations opertively connected to at least one of said transmitters and receivers.

20. The system of claim 1 including a communications array.

21. The system of claim 1 including a communications array operatively connected to said transmitter.

22. The system of claim 1 including a communications array operatively connected to said receiver.

23. The system of claim 1 including a communications array operatively connected to said transmitter and a communications array operatively connected to said receiver.

24. A communication system apparatus for transmitting a transmitted signal through a channel medium wherein the channel medium may create channel distortions comprising:
a pilot signal transmitter and a pilot signal receiver adapted to transmit a pilot signal through the channel medium,
a pilot signal estimator for using said pilot signal for estimating a pilot signal passed through the channel medium producing an estimated pilot signal,
a transmitter for transmitting the transmitted signal through the channel medium,
a receiver for receiving the transmitted signal,
a digitizer for digitizing the transmitted signal producing a digitized signal,
a point-to-point time-reversal signal processor for time-reversing said digitized signal wherein said digitizer for digitizing the signal and said time-reversal signal processor for time-reversing said digitized signal utilize said estimated pilot signal to remove the channel distortions from the transmitted signal.

25. The system of claim 24 wherein said time-reversal signal processor for time-reversing said digitized signal is operatively connected to said transmitter.

26. The system of claim 24 wherein said time-reversal signal processor for time-reversing said digitized signal is operatively connected to said receiver.

27. The system of claim 24 wherein said digitizer for digitizing said signal is operatively connected to said transmitter.

28. The system of claim 24 wherein said digitizer for digitizing said signal is operatively connected to said receiver.

29. The system of claim 24 wherein said time-reversal signal processor for time-reversing said digitized signal and said digitizer for digitizing said signal are operatively connected to said transmitter.

30. The system of claim 24 wherein said time-reversal signal processor for time-reversing said digitized signal and said digitizer for digitizing said signal are operatively connected to said receiver.

31. A communication method of transmitting a transmitted signal through a channel medium wherein the channel medium may create channel distortions, comprising the steps of:
transmitting a pilot signal through the channel medium using a pilot signal transmitter and receiver,
transmitting a transmitted signal through the channel medium using a transmitter and receiver,
digitizing said transmitted signal producing a digitized signal,
time-reversing said digitized signal creating a time-reversed signal, and
transmitting said time-reversed signal through the channel medium, said step of transmitting said time-reversed signal through the channel medium including using said pilot signal to remove the channel distortions.

32. The method of claim 31 wherein said step of digitizing the transmitted signal is performed in connection with a transmitter.

33. The method of claim 31 wherein said step of digitizing the transmitted signal is performed in connection with a receiver.

34. The method of claim 31 wherein said step of time-reversing the digitized signal is performed in connection with a transmitter.

35. The method of claim 31 wherein said step of time-reversing said digitized signal is performed in connection with a receiver.

36. The method of claim 31 wherein said step of digitizing the transmitted signal and said step of time-reversing said digitized signal is performed in connection with a transmitter.

37. The method of claim 31 wherein said step of digitizing the transmitted signal and said step of time-reversing said digitized signal is performed in connection with a receiver.

38. The method of claim 31 wherein a multiplicity of transmitters are used in said step of transmitting the transmitted signal through said channel medium.

39. The method of claim 31 wherein a multiplicity of receivers are used in said step of transmitting the transmitted signal through said channel medium.

40. The method of claim 31 wherein a multiplicity of transmitters and a multiplicity of receivers are used in said step of transmitting the transmitted signal through said channel medium.

41. The method of claim 31 wherein the channel medium comprises air.

42. The method of claim 31 wherein the channel medium comprises earth.

43. The method of claim 31 wherein the channel medium comprises water.

44. The method of claim 31 wherein the channel medium comprises tissue.

45. The method of claim 31 wherein the channel medium comprises metal.

46. The method of claim 31 wherein the channel medium comprises non-metal.

47. The method of claim 31 including the step of estimating Green's function of the channel medium.

48. The method of claim 31 including the step of determining Green's function of the channel medium.

49. The method of claim 31 wherein a multiplicity of link stations are used in said step of transmitting the transmitted signal through the channel medium.

50. The method of claim 31 including the step of providing a secure communication to an individual link station of a multiplicity of link stations by digitizing the transmitted signal and time-reversing said digitized signal in connection with said step of transmitting the transmitted signal through the channel medium to said individual link station.

51. A communication method of transmitting a transmitted signal through a channel medium wherein the channel medium may create channel distortions, comprising the steps of:

transmitting a pilot signal through the channel medium using a pilot signal transmitter and receiver, estimating an estimated pilot signal as it would be transmitted through the channel medium using said pilot signal, transmitting a transmitted signal through the channel medium using a transmitter and receiver, digitizing the transmitted signal producing a digitized signal, time-reversing said digitized signal creating a time-reversed signal, and transmitting said time-reversed signal through the channel medium wherein said estimated pilot signal is used to remove the channel distortions.

\* \* \* \* \*